(12) United States Patent
Uchiyama

(10) Patent No.: US 12,528,919 B2
(45) Date of Patent: Jan. 20, 2026

(54) MASTER BATCH FOR EXPANSION MOLDING AND FOAM MOLDED BODY

(71) Applicant: SEKISUI CHEMICAL CO., LTD., Osaka (JP)

(72) Inventor: Yusaku Uchiyama, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 897 days.

(21) Appl. No.: 16/652,746

(22) PCT Filed: Sep. 28, 2018

(86) PCT No.: PCT/JP2018/036337
§ 371 (c)(1),
(2) Date: Apr. 1, 2020

(87) PCT Pub. No.: WO2019/073825
PCT Pub. Date: Apr. 18, 2019

(65) Prior Publication Data
US 2020/0231763 A1 Jul. 23, 2020

(30) Foreign Application Priority Data
Oct. 13, 2017 (JP) ................................. 2017-199416

(51) Int. Cl.
| | | |
|---|---|---|
| C08J 3/22 | (2006.01) | |
| B29C 44/34 | (2006.01) | |
| C08J 9/32 | (2006.01) | |
| B29K 27/00 | (2006.01) | |
| B29K 33/00 | (2006.01) | |
| B29K 33/20 | (2006.01) | |

(52) U.S. Cl.
CPC ............ *C08J 3/22* (2013.01); *B29C 44/3461* (2013.01); *B29C 44/355* (2013.01); *C08J 9/32* (2013.01); *B29K 2027/08* (2013.01); *B29K 2033/08* (2013.01); *B29K 2033/20* (2013.01); *C08J 2203/22* (2013.01); *C08J 2327/08* (2013.01); *C08J 2333/08* (2013.01); *C08J 2333/20* (2013.01)

(58) Field of Classification Search
CPC ... C08J 3/22; C08J 9/32; C08J 2203/22; C08J 2203/226; C08J 2323/16; B29C 44/3461; B29C 44/355; C08F 210/16; C08L 23/16
See application file for complete search history.

(56) References Cited

U.S. PATENT DOCUMENTS

| 10,731,020 B2 | 8/2020 | Tayagaki et al. |
|---|---|---|
| 2004/0136753 A1 | 7/2004 | Kato et al. |
| 2009/0137691 A1 | 5/2009 | Ejiri |
| 2011/0166242 A1 | 7/2011 | Kawaguchi et al. |
| 2011/0263746 A1 | 10/2011 | Kawaguchi et al. |
| 2013/0202902 A1* | 8/2013 | DeJesus ............. C09J 123/0807 524/505 |
| 2014/0088211 A1 | 3/2014 | Hayashi et al. |
| 2014/0288199 A1 | 9/2014 | Kawaguchi et al. |
| 2014/0378256 A1 | 12/2014 | Tamura et al. |
| 2017/0009039 A1 | 1/2017 | Ebe et al. |
| 2017/0081492 A1 | 3/2017 | Sakabe et al. |
| 2017/0292016 A1* | 10/2017 | Chung .................... C08L 23/10 |
| 2018/0208733 A1* | 7/2018 | Tayagaki ............. B29D 35/122 |

FOREIGN PATENT DOCUMENTS

| CN | 101115816 | 1/2008 |
|---|---|---|
| CN | 102203205 | 9/2011 |
| CN | 103492469 | 1/2014 |
| CN | 104844944 | 8/2015 |
| CN | 106459729 | 2/2017 |
| EP | 1 275 688 | 1/2003 |
| EP | 2 336 226 | 6/2011 |
| JP | 5-9326 | 1/1993 |
| JP | 05-279524 | 10/1993 |
| JP | 10-158428 | 6/1998 |
| JP | 10-212372 | 8/1998 |
| JP | 10-231379 | 9/1998 |
| JP | 11-343362 | 12/1999 |
| JP | 2000-017103 | 1/2000 |
| JP | 2000-178372 | 6/2000 |

(Continued)

OTHER PUBLICATIONS

Machine translation of KR20160115700A by Woo et al. (Year: 2016).*
Machine translation of JP 2000026671 by Uchida et al (Year: 2000).*
Machine Translation of Table 1 col. 1 of JP2009120660 by Kawaguchi et al. (Year: 2009).*
Machine Translation of JP2009120660 by Kawaguchi et al. (Year: 2009).*
International Search Report issued Dec. 25, 2018 in International (PCT) Patent Application No. PCT/JP2018/036337.
"Expancel® Thermally expandable microcapsule", Japan Fillite Co., Ltd., 2010, Partial Translation.

(Continued)

*Primary Examiner* — Christina H.W. Rosebach
(74) *Attorney, Agent, or Firm* — Wenderoth, Lind & Ponack, L.L.P.

(57) ABSTRACT

The present invention aims to provide a masterbatch for foam molding which can be suitably used in molding involving high shear force or molding requiring low molding temperature and which can provide a foam molded article having a high expansion ratio and good appearance quality. The present invention also aims to provide a foam molded article formed from the masterbatch for foam molding. Provided is a masterbatch for foam molding, containing: a base resin; and a thermally expandable microcapsule, the masterbatch having a true specific gravity of 0.80 g/cm³ or more, the base resin containing an olefin elastomer, the masterbatch containing the thermally expandable microcapsule in an amount of 40 to 300 parts by weight relative to 100 parts by weight of the base resin.

9 Claims, No Drawings

(56) References Cited

FOREIGN PATENT DOCUMENTS

| | | | |
|---|---|---|---|
| JP | 2002-105247 | 4/2002 | |
| JP | 2002-264173 | 9/2002 | |
| JP | 2004-91746 | 3/2004 | |
| JP | 2005-212377 | 8/2005 | |
| JP | 2009-120660 | 6/2009 | |
| JP | 2009120660 A * | 6/2009 | |
| JP | 2009-203451 | 9/2009 | |
| JP | 2010-264686 | 11/2010 | |
| JP | 2010-275335 | 12/2010 | |
| JP | 2010-539289 | 12/2010 | |
| JP | 2012-92226 | 5/2012 | |
| JP | 2012-213615 | 11/2012 | |
| JP | 2013-213077 | 10/2013 | |
| JP | 2014-070102 | 4/2014 | |
| JP | 2014-070198 | 4/2014 | |
| JP | 2015-021066 | 2/2015 | |
| JP | 2017-082244 | 5/2017 | |
| WO | 2009/035877 | 3/2009 | |
| WO | 2010/038615 | 4/2010 | |
| WO | 2015/119048 | 8/2015 | |
| WO | WO-2016064479 A1 * | 4/2016 | ............. C08J 3/226 |
| WO | 2017/014064 | 1/2017 | |
| WO | WO-2017014064 A1 * | 1/2017 | ........... B29B 7/7495 |

OTHER PUBLICATIONS

"Expancel® Microspheres Product Specification, Expancel DU, Dry Unexpanded Microspheres", 2007.
"Plastic Processing Technology Handbook", The Nikkan Kogyo Shimbun Ltd., 1960, Partial Translation.
Oki Michinori et al., "Encyclopedic Dictionary of Chemistry", Tokyo Kagaku Dojin, 1989, Partial Translation.
"Engage™ Polyolefin Elastomers, Product Selection Guide", The Dow Chemical Company, 2015.
Ino Syoei, "Vistamaxx performance polymers Compound Applications", ExxonMobil Japan G.K., 2016, Partial Translation.
"Plastic Processing Technology Handbook", The Nikkan Kogyo Shimbun Ltd., pp. 164, 165, 187, and 193, with Partial English translation.
"Specialty Chemicals Division (Sekisui Chemical Co., Ltd.) website", product information Advancell EM, [Online], Sekisui Chemical Co., Ltd., Internet, accessed Oct. 27, 2020, <URL: https://www.sekisui.co.jp/cs/products/1270513_25825.html>, with Partial English translation.
"Encyclopedic Dictionary of Chemistry", Michinori Oki et al., ed., Tokyo Kagaku Dojin, p. 1437, with Partial English translation.
"Linear low-density polyethylene Novatec™ LL | product information | Mitsubishi Chemical Corporation", [Online] Mitsubishi Chemical Corporation, Internet, accessed Nov. 1, 2020, <URL: https://www.m-chemical.co.jp/products/departments/group/jpe/product/1200017_7016.html>, with Partial English translation.
Extended European Search Report issued Mar. 31, 2021 in corresponding European Patent Application No. 18865527.8.
"Processing Aids of Plastic and Rubber", Chemical Industry Press, 1983, pp. 593-594, with concise explanation.
"What is the composition and production of EPDM rubber", by Alanto, 2016.
Extended European Search Report issued Apr. 7, 2021 in European Application No. 18866550.9.
International Preliminary Report on Patentability and Written Opinion issued Apr. 14, 2020 in International (PCT) Application No. PCT/JP2018/036332.

* cited by examiner

MASTER BATCH FOR EXPANSION MOLDING AND FOAM MOLDED BODY

TECHNICAL FIELD

The present invention relates to a masterbatch for foam molding which can be suitably used in molding involving high shear force or molding requiring low molding temperature and which can provide a foam molded article having a high expansion ratio and good appearance quality. The present invention also relates to a foam molded article formed from the masterbatch for foam molding.

BACKGROUND ART

Plastic foams can exhibit heat shielding properties, heat insulation properties, sound insulation properties, sound absorption properties, vibration proofing properties, light weight, and the like according to the material of the foam and the state of the formed cells. Plastic foams are thus used in various applications. An exemplary method for producing a plastic foam involves foaming and molding a masterbatch containing a chemical foaming agent under heat. Such a masterbatch containing a chemical foaming agent, however, is difficult to handle because sometimes it fails to foam even under heat, and the foaming agent may rapidly decompose in the injection foam molding device. In addition, such a masterbatch may fail to provide a sufficient expansion ratio depending on the type of the resin, making it difficult for the molded article to have desired hardness.

Patent Literature 1 teaches that an ethylene-α-olefin copolymer masterbatch pellet containing a chemical foaming agent can provide an injection foam molded article having high hardness, a high expansion ratio, and uniformly formed cells, regardless of the type of the resin.

However, chemical foaming agents, when decomposed under heat, produce foam residue as well as decomposition gas. The residue remaining in the molded article may affect the adhesiveness of the molded article. In addition, with the use of the chemical foaming agent, not all the cells are formed as closed cells, and some open cells are inevitably formed, making it difficult to provide a highly airtight foam molded article.

Patent Literature 2 discloses a masterbatch for a foamed resin which contains a polyolefin resin or styrene resin as a base resin and contains a thermally expandable microcapsule as a foaming agent instead of a chemical foaming agent.

Unfortunately, with the thermally expandable microcapsule disclosed in Patent Literature 2, the resulting foam has a low expansion ratio, and it is difficult to adjust the closed cells of the resulting foam to a predetermined size.

Meanwhile, Patent Literature 3 discloses a method for producing a foam complex sheet, including foaming and molding a resin composition obtained by blending a masterbatch containing a thermally expandable microcapsule and a masterbatch containing a chemical foaming agent.

Although such a method improves the expansion ratio to some extent, the molded article still has a low expansion ratio and fails to exhibit desired properties such as light weight and heat insulation properties. In addition, by this method, it is difficult to produce a molded article with good appearance quality.

Patent Literature 4 discloses a synthetic resin composition containing a thermally expandable microcapsule and a base resin, and a method for producing the composition. The literature teaches that the synthetic resin composition contains a base resin having a melt flow rate in a predetermined range, so that the base resin does not break the shell of the thermally expandable microcapsule and has high miscibility or compatibility with the thermally expandable microcapsule.

CITATION LIST

Patent Literature

Patent Literature 1: JP 2000-178372 A
Patent Literature 2: JP H11-343362 A
Patent Literature 3: JP 2005-212377 A
Patent Literature 4: JP 2002-264173 A

SUMMARY OF INVENTION

Technical Problem

The present invention aims to provide a masterbatch for foam molding which can be suitably used in molding involving high shear force or molding requiring low molding temperature and which can provide a foam molded article having a high expansion ratio and good appearance quality. The present invention also aims to provide a foam molded article formed from the masterbatch for foam molding.

Solution to Problem

The present invention relates to a masterbatch for foam molding, containing: a base resin; and a thermally expandable microcapsule, the masterbatch having a true specific gravity of 0.80 g/cm$^3$ or more, the base resin containing an olefin elastomer, the masterbatch containing the thermally expandable microcapsule in an amount of 40 to 300 parts by weight relative to 100 parts by weight of the base resin.

The present invention is described in detail below.

The present inventors made intensive studies to find out that a masterbatch can be suitably used in molding involving high shear force or molding requiring low molding temperature when the masterbatch contains an olefin elastomer as a base resin and a thermally expandable microcapsule as a foaming component, and the amount of the thermally expandable microcapsule and the amount of the base resin are set within predetermined ranges. The inventors also found out that such a masterbatch can provide a foam molded article having a high expansion ratio and good appearance quality. The inventors thus completed the present invention.

The masterbatch for foam molding of the present invention contains a base resin.

In the present invention, an olefin elastomer is used as the base resin. This allows production of a foam molded article having good appearance quality.

The olefin elastomer may be, for example, a copolymer containing an olefin as a main component. Examples of the olefin as a main component include α-olefin such as ethylene, propylene, 1-butene, 1-pentene, 1-hexene, and 1-octene. In particular, propylene elastomers and ethylene elastomers are preferred.

The propylene elastomer means an elastomer containing propylene as a main component.

In the propylene elastomers or ethylene elastomers, a component other than propylene or ethylene is preferably an α-olefin (propylene-α-olefin elastomer or ethylene-α-olefin elastomer).

The α-olefin in the propylene elastomer may be ethylene. The α-olefin in the ethylene elastomer may be propylene.

Examples of the α-olefin include C4-C20 α-olefins. Examples of the C4-C20 α-olefin include 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-hexadecene, 1-octadecene, and 1-eicosene.

These α-olefins may be used alone or in combination of two or more thereof. Preferred α-olefins are ethylene, propylene, 1-butene, 1-pentene, 1-hexene, 4-methyl-1-pentene, 1-heptene, and 1-octene. More preferred are ethylene, 1-butene, 1-pentene, 1-hexene, and 4-methyl-1-pentene. Still more preferred are ethylene, propylene, and 1-butene.

When the olefin elastomer is a propylene elastomer, the lower limit of the propylene content of the propylene elastomer (percentage by weight of the propylene component in the entire propylene elastomer) is preferably 80% by weight and the upper limit thereof is preferably 97% by weight.

The use of a propylene elastomer having a propylene content within the above range can improve the dispersibility of the thermally expandable microcapsule and the moldability.

The lower limit of the propylene content is more preferably 85% by weight and the upper limit thereof is more preferably 95% by weight.

When the propylene elastomer contains an ethylene component, the lower limit of the ethylene content (percentage by weight of the ethylene component in the entire propylene elastomer) is preferably 3% by weight and the upper limit thereof is preferably 20% by weight.

The lower limit of the ethylene content is more preferably 5% by weight and the upper limit thereof is more preferably 15% by weight.

The lower limit of the weight average molecular weight of the olefin elastomer is preferably 10,000 and the upper limit is preferably 1,000,000.

The lower limit of the melt index of the olefin elastomer is preferably 2 g/10 min and the upper limit thereof is preferably 30 g/10 min.

When the melt index is 2 g/10 min or more, deformation of the masterbatch can be prevented. When the melt index is 30 g/10 min or less, the resulting molded article can have good appearance.

The lower limit of the melt index is more preferably 2 g/10 min and the upper limit thereof is more preferably 20 g/10 min.

The melt index is an index of fluidity of a resin. A predetermined amount of a synthetic resin is heated at a predetermined temperature (e.g., 190° C.) and pressurized at a predetermined load (e.g., 2.16 kg) in a cylindrical container heated with a heater. The melt index is expressed as the amount of the resin extruded from an opening (nozzle) formed at the bottom of the container per 10 minutes. The unit is g/10 min. The melt index is measured by a measurement method specified in JIS K7210-1.

The lower limit of the melting point of the olefin elastomer is preferably 50° C. and the upper limit thereof is preferably 120° C.

When the melting point is 50° C. or higher, blocking of the masterbatch can be prevented. When the melting point is 120° C. or lower, foaming during production of the masterbatch can be prevented.

The lower limit of the melting point is more preferably 60° C. and the upper limit thereof is more preferably 110° C.

The melting point means the peak temperature at the melting peak obtained by DSC.

The olefin elastomer may account for 100% by weight of the base resin. Alternatively, in addition to the olefin elastomer, one or two or more resin components other than the olefin elastomer may be appropriately mixed.

In the case of using resin component(s) other than the olefin elastomer, the proportion of the olefin elastomer is preferably 80% by weight or more, more preferably 90% by weight or more.

Examples of the resin component other than the olefin elastomer include rubber components. Examples of the rubber component include natural rubber (NR), butadiene rubber (BR), styrene butadiene rubber (SBR), isoprene rubber (IR), acrylonitrile-butadiene rubber (NBR), butyl rubber (IIR), chloroprene rubber (CR), acrylic rubber (ACM, ANM), urethane rubber (U), and silicone rubber (Si). One or two or more selected from the rubber components may be used in combination.

A common thermoplastic resin may be used as the resin component other than the olefin elastomer.

Examples of the thermoplastic resin include common thermoplastic resins such as polyvinyl chloride, polypropylene, polypropylene oxide, low density polyethylene, high density polyethylene, and polystyrene, and engineering plastics such as polybutylene terephthalate, nylon, polycarbonate, and polyethylene terephthalate. In particular, the thermoplastic resin is preferably at least one selected from the group consisting of low density polyethylene, high density polyethylene, polypropylene, and polystyrene.

In the masterbatch for foam molding of the present invention, the lower limit of the amount of the base resin is preferably 30% by weight and the upper limit thereof is preferably 70% by weight. When the amount of the base resin is less than 30% by weight, foaming may occur during production of the masterbatch, and the masterbatch may not be obtained. When the amount of the base resin is more than 70% by weight, a desired expansion ratio may not be obtained.

The masterbatch for foam molding of the present invention contains a thermally expandable microcapsule.

The lower limit of the amount of the thermally expandable microcapsule in the masterbatch for foam molding of the present invention relative to 100 parts by weight of the base resin is 40 parts by weight and the upper limit thereof is 300 parts by weight. When the amount of the thermally expandable microcapsule is 40 parts by weight or more, a desired expansion ratio can be obtained. When the amount of the thermally expandable microcapsule is 300 parts by weight or less, foaming during production of the masterbatch can be prevented. As a result, the expansion ratio of the foam molded article can be improved. The lower limit of the amount of the thermally expandable microcapsule is preferably 65 parts by weight and the upper limit thereof is preferably 150 parts by weight.

The shell constituting the thermally expandable microcapsule preferably contains a polymer obtained by polymerizing a monomer mixture that contains a polymerizable monomer (I) containing at least one selected from acrylonitrile, methacrylonitrile, and vinylidene chloride.

The addition of the polymerizable monomer (I) can improve the gas barrier properties of the shell.

In order to further improve the heat resistance, the shell constituting the thermally expandable microcapsule preferably contains a polymer obtained by polymerizing a monomer mixture that contains 40 to 90% by weight of the polymerizable monomer (I) and 5 to 50% by weight of a radically polymerizable unsaturated carboxylic acid monomer (II) having a carboxy group and having a carbon number of 3 to 8.

The lower limit of the amount of the polymerizable monomer (I) in the monomer mixture is preferably 40% by weight and the upper limit thereof is preferably 90% by weight. When the amount of the polymerizable monomer (I) in the monomer mixture is less than 40% by weight, the shell has low gas barrier properties, which may decrease the expansion ratio. When the amount of the polymerizable monomer (I) in the monomer mixture is more than 90% by weight, the heat resistance may not increase. The lower limit of the amount of the polymerizable monomer (I) in the monomer mixture is more preferably 50% by weight and the upper limit thereof is more preferably 80% by weight.

The radically polymerizable unsaturated carboxylic acid monomer (II) having a carboxy group and having a carbon number of 3 to 8 may be a monomer having one or more free carboxyl groups per molecule for ionic crosslinking. Specific examples thereof include: unsaturated monocarboxylic acids, unsaturated dicarboxylic acids, and anhydrides thereof; and monoesters of unsaturated dicarboxylic acids and derivatives thereof.

Examples of the unsaturated monocarboxylic acid include acrylic acid, methacrylic acid, ethacrylic acid, crotonic acid, and cinnamic acid. Examples of the unsaturated dicarboxylic acid include maleic acid, itaconic acid, fumaric acid, citraconic acid, and chloromaleic acid. Examples of the monoester of the unsaturated dicarboxylic acid include monomethyl maleate, monoethyl maleate, monobutyl maleate, monomethyl fumarate, monoethyl fumarate, monomethyl itaconate, monoethyl itaconate, and monobutyl itaconate. These may be used alone or in combination of two or more thereof. Particularly preferred among them are acrylic acid, methacrylic acid, maleic acid, maleic anhydride, and itaconic acid.

In the monomer mixture, the lower limit of the amount of a segment derived from the radically polymerizable unsaturated carboxylic acid monomer (II) having a carboxy group and having a carbon number of 3 to 8 is preferably 5% by weight and the upper limit thereof is preferably 50% by weight. When the amount of the segment derived from the radically polymerizable unsaturated carboxylic acid monomer (II) is less than 5% by weight, the maximum foaming temperature may be 190° C. or lower. When the amount of the segment derived from the radically polymerizable unsaturated carboxylic acid monomer (II) is more than 50% by weight, the maximum foaming temperature is improved, but the expansion ratio is decreased. The lower limit of the amount of the segment derived from the radically polymerizable unsaturated carboxylic acid monomer (II) in the monomer mixture is more preferably 10% by weight and the upper limit thereof is more preferably 40% by weight.

The monomer mixture is not limited as long as the amounts of the polymerizable monomer (I) and the segment derived from the radically polymerizable unsaturated carboxylic acid monomer (II) having a carboxy group and having a carbon number of 3 to 8 are within the above ranges. Preferably, any of the following monomer mixtures (1) to (3) is used.

The monomer mixture (1) contains 40 to 90% by weight of the polymerizable monomer (I) and 5 to 50% by weight of the radically polymerizable unsaturated carboxylic acid monomer (II) having a carboxy group and having a carbon number of 3 to 8, and is free of a polymerizable monomer (III) having two or more double bonds in a molecule.

The monomer mixture (1) is free of a polymerizable monomer (III) having two or more double bonds in a molecule. The polymerizable monomer (III) is a monomer usually used as a cross-linking agent.

The monomer mixture (1) contains predetermined amounts of the polymerizable monomer (I) and the radically polymerizable unsaturated carboxylic acid monomer (II). With the use of the monomer mixture, a shell having sufficient strength can be obtained. Thus, even when the monomer mixture is free of a polymerizable monomer (III) having two or more double bonds in a molecule, the thermally expandable microcapsule can have excellent shear resistance, heat resistance, and foamability. The reason for the sufficient strength is not clear, but crosslinking by the dehydration condensation between carboxyl groups is presumably involved.

When the polymerizable monomer (III) is added, the thermally expandable microcapsule has a distorted particle shape, resulting in a decreased bulk specific gravity. With a decreased bulk specific gravity, especially when the masterbatch is produced by extrusion molding in the subsequent step, the thermally expandable microcapsule is more susceptible to shear, and thus is more likely to foam. As a result, for example, the true specific gravity of the masterbatch is decreased. This makes it impossible to produce a stable masterbatch, so that variation in the expansion ratio easily occurs in the subsequent foam molding performed by injection molding or the like.

As described above, the monomer mixture (1) enables production of a thermally expandable microcapsule having sufficient strength and heat resistance without the use of a polymerizable monomer (III) having two or more double bonds in a molecule. The expression "the monomer mixture is free of a polymerizable monomer (III) having two or more double bonds in a molecule" herein means that the monomer mixture is substantially free of the polymerizable monomer. (III). When the monomer mixture contains the polymerizable monomer (III) in a trace amount, the monomer mixture is regarded as being free of the polymerizable monomer (III).

Examples of the polymerizable monomer (III) include monomers having two or more radically polymerizable double bonds. Specific examples thereof include divinylbenzene, ethylene glycol di(meth)acrylate, diethylene glycol di(meth)acrylate, triethylene glycol di(meth)acrylate, propylene glycol di(meth)acrylate, and 1,4-butanediol di(meth)acrylate. Examples also include 1,6-hexanediol di(meth)acrylate, 1,9-nonanediol di(meth)acrylate, di(meth)acrylate of polyethylene glycol having a molecular weight of 200 to 600, glycerol di(meth)acrylate, and trimethylolpropane di(meth)acrylate.

Examples also include trimethylolpropane tri(meth)acrylate, ethylene oxide-modified trimethylolpropane tri(meth)acrylate, pentaerythritol tri(meth)acrylate, and triallylformal tri(meth)acrylate. Examples also include pentaerythritol tetra(meth)acrylate, dipentaerythritol hexa(meth)acrylate, and dimethylol-tricyclodecane di(meth)acrylate.

The monomer mixture (2) contains 40 to 90% by weight of the polymerizable monomer (I), 5 to 50% by weight of the radically polymerizable unsaturated carboxylic acid monomer (II) having a carboxy group and having a carbon number of 3 to 8, 0.2% by weight or less of the polymerizable monomer (III), and 0.1 to 10% by weight of a metal cation hydroxide (IV).

The monomer mixture (2) preferably contains the polymerizable monomer (III) having two or more double bonds in a molecule. The polymerizable monomer (III) functions as a cross-linking agent.

When the polymerizable monomer (III) is contained, the strength of the shell can be enhanced, and the cell wall is less likely to break upon thermal expansion.

The polymerizable monomer (III) is not limited as long as it is different from the radically polymerizable unsaturated carboxylic acid monomer (II) having a carboxy group and having a carbon number of 3 to 8. Typically, a monomer having two or more radically polymerizable double bonds is suitably used. Specific examples thereof include divinylbenzene, ethylene glycol di(meth)acrylate, diethylene glycol di(meth)acrylate, triethylene glycol di(meth)acrylate, propylene glycol di(meth)acrylate, and 1,4-butanediol di(meth)acrylate. Examples also include 1,6-hexanediol di(meth)acrylate, 1,9-nonanediol di(meth)acrylate, di(meth)acrylate of polyethylene glycol having a molecular weight of 200 to 600, glycerol di(meth)acrylate, and trimethylolpropane di(meth)acrylate. Examples also include trimethylolpropane tri(meth)acrylate, ethylene oxide-modified trimethylolpropane tri(meth)acrylate, pentaerythritol tri(meth)acrylate, and triallylformal tri(meth)acrylate. Examples also include pentaerythritol tetra(meth)acrylate, dipentaerythritol hexa(meth)acrylate, and dimethylol-tricyclodecane di(meth)acrylate.

The upper limit of the amount of the polymerizable monomer (III) in the monomer mixture (2) is preferably 0.2% by weight. When the polymerizable monomer (III) is added in an amount more than 0.2% by weight, the thermally expandable microcapsule has a distorted particle shape, resulting in a decreased bulk specific gravity. With a decreased bulk specific gravity, especially when the masterbatch is produced by extrusion molding in the subsequent step, the thermally expandable microcapsule is more susceptible to shear, and thus is more likely to foam. As a result, for example, the true specific gravity of the masterbatch is decreased. This makes it impossible to produce a stable masterbatch, so that variation in the expansion ratio easily occurs in the subsequent foam molding performed by injection molding or the like. In the present invention, the amount of the polymerizable monomer (III) is 0.2% by weight or less, so that the decrease in the bulk specific gravity can be prevented. The lower limit of the amount of the polymerizable monomer (III) is preferably 0% by weight. The upper limit thereof is more preferably 0.1% by weight.

The monomer mixture (2) preferably contains a metal cation hydroxide (IV).

When the monomer mixture (2) contains the metal cation hydroxide (IV), ionic bonding is formed between the metal cation hydroxide (IV) and the carboxy group of the radically polymerizable unsaturated carboxylic acid monomer (II), increasing the rigidity and the heat resistance. As a result, the thermally expandable microcapsule neither breaks nor shrinks in a high temperature range for a long time. In addition, the elastic modulus of the shell is less likely to decrease even in a high temperature range, so that the thermally expandable microcapsule neither breaks nor shrinks in molding processing involving strong shear force such as knead molding, calender molding, extrusion molding, or injection molding.

Since ionic bonding, not covalent bonding, is formed, the thermally expandable microcapsule has a particle shape close to a perfect sphere and is less likely to be distorted. This is presumably because crosslinking by ionic bonding exhibits lower bonding strength than crosslinking by covalent bonding. The volume of the thermally expandable microcapsule thus uniformly shrinks when the monomers are converted to a polymer during polymerization.

The metal cation of the metal cation hydroxide (IV) may be any metal cation that reacts with the radically polymerizable unsaturated carboxylic acid monomer (II) to form ionic bonding. Examples thereof include ions of Na, K, Li, Zn, Mg, Ca, Ba, Sr, Mn, Al, Ti, Ru, Fe, Ni, Cu, Cs, Sn, Cr, and Pb. Since the purpose is to form ionic bonding with the radically polymerizable unsaturated carboxylic acid monomer (II), a hydroxide of the metal cation is needed. Chlorides such as NaCl, which form weak ionic bonding, do not fall within the category. In particular, the ions of Ca, Zn, and Al, which are divalent or trivalent metal cations, are preferred, and the ion of Zn is particularly preferred. These metal cation hydroxides (IV) may be used alone or in combination of two or more thereof.

In the monomer mixture (2), the lower limit of the amount of the metal cation hydroxide (IV) is preferably 0.1% by weight and the upper limit thereof is preferably 10% by weight. When the amount of the metal cation hydroxide (IV) is less than 0.1% by weight, the metal cation hydroxide (IV) may have no effect on the heat resistance. When the amount of the metal cation hydroxide (IV) is more than 10% by weight, the expansion ratio may be significantly low. The lower limit of the metal cation hydroxide (IV) is more preferably 0.5% by weight and the upper limit thereof is more preferably 5% by weight.

The monomer mixture (3) contains 40 to 90% by weight of the polymerizable monomer (I), 5 to 50% by weight of the radically polymerizable unsaturated carboxylic acid monomer (II) having a carboxy group and having a carbon number of 3 to 8, and 0.1 to 10% by weight of the metal cation hydroxide (IV), and is free of the polymerizable monomer (III) having two or more double bonds in a molecule.

The monomer mixture (3) is free of the polymerizable monomer (III) having two or more double bonds in a molecule.

The crosslinking by ionic bonding between the radically polymerizable unsaturated carboxylic acid monomer (II) and the metal cation hydroxide (IV) allows the resulting shell to have sufficient strength and heat resistance even when the monomer mixture is free of the polymerizable monomer (III) having two or more double bonds in a molecule. When the polymerizable monomer (III) is added, the thermally expandable microcapsule has a distorted particle shape, resulting in a decreased bulk specific gravity. With a decreased bulk specific gravity, especially when the masterbatch is produced by extrusion molding in the subsequent step, the thermally expandable microcapsule is more susceptible to shear, and thus is more likely to foam. As a result, for example, the true specific gravity of the masterbatch is decreased. This makes it impossible to produce a stable masterbatch, so that variation in the expansion ratio easily occurs in the subsequent foam molding performed by injection molding or the like.

The monomer mixture (3) mainly causes the crosslinking by ionic bonding and decreases the crosslinking by covalent bonding, and thereby enables production of a thermally expandable microcapsule having sufficient strength and heat resistance without the use of the polymerizable monomer (III) having two or more double bonds in a molecule. The expression "the monomer mixture is free of a polymerizable monomer (III) having two or more double bonds in a molecule" herein means that the monomer mixture (III) is substantially free of the polymerizable monomer (III). When the monomer mixture contains the polymerizable monomer (III) in a trace amount, the monomer mixture is regarded as being free of the polymerizable monomer (III).

The monomer mixture may contain other monomers in addition to the polymerizable monomer (I), radically polymerizable unsaturated carboxylic acid monomer (II), and the like. Examples of such other monomers include acrylates such as methyl acrylate, ethyl acrylate, butyl acrylate, and dicyclopentenyl acrylate; methacrylates such as methyl methacrylate, ethyl methacrylate, butyl methacrylate, and isobornyl methacrylate; and vinyl monomers such as vinyl acetate and styrene. These other monomers may be appropriately selected according to the characteristics required for the thermally expandable microcapsule. Preferred among them are methyl methacrylate, ethyl methacrylate, and methyl acrylate. The amount of such other monomers in all the monomers constituting the shell is preferably less than 10% by weight. When the amount of such other monomers is 10% by weight or more, the gas barrier properties of the cell wall are reduced, and thermal expandability tends to be disadvantageously deteriorated.

The monomer mixture contains a polymerization initiator to polymerize the monomers.

Suitable polymerization initiators include dialkyl peroxides, diacyl peroxides, peroxy esters, peroxydicarbonates, and azo compounds.

Examples of the dialkyl peroxide include methyl ethyl peroxide, di-t-butyl peroxide, isobutyl peroxide, and dicumyl peroxide.

Examples of the diacyl peroxide include benzoyl peroxide, 2,4-dichlorobenzoyl peroxide, and 3,5,5-trimethylhexanoyl peroxide.

Examples of the peroxy ester include t-butyl peroxypivalate, t-hexyl peroxypivalate, t-butyl peroxyneodecanoate, t-hexyl peroxyneodecanoate, 1-cyclohexyl-1-methylethyl peroxyneodecanoate, and 1,1,3,3-tetramethylbutyl peroxyneodecanoate.

Examples of the peroxydicarbonate include bis(4-t-butylcyclohexyl) peroxydicarbonate, di-n-propyl-oxydicarbonate, diisopropyl peroxydicarbonate, di(2-ethylethylperoxy) dicarbonate, and dimethoxybutyl peroxydicarbonate.

Examples of the azo compound include 2,2'-azobisisobutyronitrile, 2,2'-azobis(4-methoxy-2,4-dimethylvaleronitrile), 2,2'-azobis(2,4-dimethylvaleronitrile), and 1,1'-azobis(1-cyclohexanecarbonitrile).

The lower limit of the weight average molecular weight of the polymer constituting the shell is preferably 100,000 and the upper limit thereof is preferably 2,000,000. When the weight average molecular weight is less than 100,000, the shell may have decreased strength. When the weight average molecular weight is more than 2,000,000, the shell may have too high strength, which may decrease the expansion ratio.

The shell may further contain a stabilizer, an ultraviolet absorber, an antioxidant, an antistatic agent, a flame retardant, a silane coupling agent, a colorant, and the like, if necessary.

The thermally expandable microcapsule includes a volatile expansion agent as a core agent encapsulated by the shell.

The volatile expansion agent is a substance that becomes gaseous at a temperature equal to or lower than the softening point of the polymer constituting the shell. The volatile expansion agent is preferably a low-boiling-point organic solvent.

Examples of the volatile expansion agent include low molecular weight hydrocarbons, chlorofluorocarbons, and tetraalkylsilanes.

Examples of the low molecular weight hydrocarbon include ethane, ethylene, propane, propene, n-butane, isobutane, butene, isobutene, n-pentane, isopentane, neopentane, n-hexane, heptane, isooctane, and petroleum ether.

Examples of the chlorofluorocarbon include $CCl_3F$, $CCl_2F_2$, $CClF_3$, and $CClF_2$—$CClF_2$.

Examples of the tetraalkylsilane include tetramethylsilane, trimethylethylsilane, trimethylisopropylsilane, and trimethyl-n-propylsilane.

In particular, isobutane, n-butane, n-pentane, isopentane, n-hexane, isooctane, petroleum ether, and mixtures of these are preferred. These volatile expansion agents may be used alone or in combination of two or more thereof.

The volatile expansion agent may be a pyrolytic compound that is pyrolyzed into a gaseous form by heat.

For the thermally expandable microcapsule, among the above volatile expansion agents, a low-boiling-point hydrocarbon having a carbon number of 5 or less is preferably used. With such a hydrocarbon, the thermally expandable microcapsule can have a high expansion ratio and quickly start foaming.

The volatile expansion agent may be a pyrolytic compound that is pyrolyzed into a gaseous form by heat.

In the masterbatch for foam molding of the present invention, the lower limit of the amount of the volatile expansion agent used as a core agent is preferably 10% by weight and the upper limit thereof is preferably 25% by weight.

The thickness of the shell varies according to the amount of the core agent. Decreasing the amount of the core agent to excessively thicken the shell leads to a decrease in the foamability. Increasing the amount of the core agent leads to a decrease in the strength of the shell. When the amount of the core agent is 10 to 25% by weight, the thermally expandable microcapsule can achieve both prevention of deflation and increase in the foamability.

The lower limit of the maximum foaming temperature (Tmax) of the thermally expandable microcapsule is preferably 180° C. and the upper limit thereof is preferably 250° C. The thermally expandable microcapsule having a maximum foaming temperature lower than 180° C. has low heat resistance, so that it breaks or shrinks in a high temperature range or during molding processing. Such a thermally expandable microcapsule also causes foaming due to shear during production of the masterbatch, preventing stable production of a non-foamed masterbatch. The lower limit of the maximum foaming temperature is more preferably 190° C.

The maximum foaming temperature herein means the temperature at which the diameter of the thermally expandable microcapsule reaches its maximum (maximum displacement) when the diameter of the thermally expandable microcapsule is measured while the thermally expandable microcapsule is heated from room temperature.

The lower limit of the volume average particle size of the thermally expandable microcapsule is preferably 5 μm and the upper limit thereof is preferably 100 μm. When the volume average particle size is less than 5 μm, the cells in the resulting molded article are too small, so that the molded article may not be light enough. When the volume average particle size is more than 100 μm, the cells of the resulting molded article are too large, which may cause a problem in terms of strength or the like. The lower limit of the volume average particle size is more preferably 10 μm and the upper limit thereof is more preferably 40 μm.

The lower limit of the bulk specific gravity of the thermally expandable microcapsule is preferably 0.40 g/cm$^3$.

The thermally expandable microcapsule having a bulk specific gravity of less than 0.40 g/cm³ is more susceptible to shear and is thus more likely to foam, especially when the masterbatch is produced by extrusion molding. As a result, for example, the true specific gravity of the masterbatch is decreased. This makes it impossible to produce a stable masterbatch, so that variation in the expansion ratio easily occurs in the subsequent foam molding performed by injection molding or the like. The lower limit of the bulk specific gravity is preferably 0.42 g/cm³.

The bulk specific gravity means a specific gravity based on the volume of an aggregate of thermally expandable microcapsules in closest packing in a container or the like. The bulk specific gravity can be measured in conformity with JIS K 6721.

An exemplary method for producing the thermally expandable microcapsule includes the steps of: preparing an aqueous medium; and dispersing an oily mixture in the aqueous medium, the oily mixture containing 40 to 90% by weight of the polymerizable monomer (I), 5 to 50% by weight of the radically polymerizable unsaturated carboxylic acid monomer (II) having a carboxy group and having a carbon number of 3 to 8, and a volatile expansion agent; and polymerizing the monomers.

In production of the thermally expandable microcapsule, first, the step of preparing an aqueous medium is performed. Specifically, for example, a polymerization reaction container is charged with water, a dispersion stabilizer, and if necessary an auxiliary stabilizer, to prepare an aqueous dispersion medium containing the dispersion stabilizer. If necessary, alkali metal nitrite, stannous chloride, stannic chloride, potassium dichromate, or the like may be added.

Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, calcium carbonate, barium carbonate, and magnesium carbonate.

The amount of the dispersion stabilizer added is not limited, and appropriately decided according to the type of the dispersion stabilizer, the particle size of the thermally expandable microcapsule, and the like. The lower limit of the amount of the dispersion stabilizer added is preferably 0.1 parts by weight and the upper limit thereof is preferably 20 parts by weight relative to 100 parts by weight of the monomers.

Examples of the auxiliary stabilizer include condensation products of diethanolamine and aliphatic dicarboxylic acids and condensation products of urea and formaldehyde. Examples also include polyvinylpyrrolidone, polyethylene oxide, polyethyleneimine, tetramethylammonium hydroxide, gelatin, methylcellulose, polyvinyl alcohol, dioctyl sulfosuccinate, sorbitan esters, and emulsifiers.

Examples of the combination of the dispersion stabilizer and the auxiliary stabilizer include, but not limited to, a combination of colloidal silica and a condensation product, a combination of colloidal silica and a water-soluble nitrogen-containing compound, and a combination of magnesium hydroxide or calcium phosphate and an emulsifier. Preferred among them is a combination of colloidal silica and a condensation product.

The condensation product is preferably a condensation product of diethanolamine and an aliphatic dicarboxylic acid, particularly preferably a condensation product of diethanolamine and adipic acid or a condensation product of diethanolamine and itaconic acid.

Examples of the water-soluble nitrogen-containing compound include polyvinylpyrrolidone, polyethyleneimine, polyoxyethylene alkylamine, polydialkylaminoalkyl (meth)acrylate, polydialkylaminoalkyl (meth)acrylamide, polyacrylamide, polycationic acrylamide, polyamine sulfone, and polyallylamine.

Examples of the polydialkylaminoalkyl (meth)acrylate include polydimethylaminoethyl methacrylate and polydimethylaminoethyl acrylate.

Examples of the polydialkylaminoalkyl (meth)acrylamide include polydimethylaminopropyl acrylamide and polydimethylaminopropyl methacrylamide. Preferred among them is polyvinylpyrrolidone.

The amount of the colloidal silica added is appropriately decided according to the particle size of the thermally expandable microcapsule. The lower limit of the amount the colloidal silica added is preferably 1 part by weight and the upper limit thereof is preferably 20 parts by weight relative to 100 parts by weight of a vinyl monomer. The lower limit is more preferably 2 parts by weight and the upper limit is more preferably 10 parts by weight. The amount of the condensation product or the water-soluble nitrogen-containing compound added is also decided according to the particle size of the thermally expandable microcapsule. The lower limit of the amount is preferably 0.05 parts by weight and the upper limit thereof is preferably 2 parts by weight relative to 100 parts by weight of the monomers.

In addition to the dispersion stabilizer and the auxiliary stabilizer, an inorganic salt such as sodium chloride or sodium sulfate may be added. Addition of an inorganic salt allows the thermally expandable microcapsule to have a more uniform particle shape. The amount of the inorganic salt added is usually preferably 0 to 100 parts by weight relative to 100 parts by weight of the monomers.

The aqueous dispersion medium containing the dispersion stabilizer is prepared by adding the dispersion stabilizer and the auxiliary stabilizer to deionized water. The pH of the aqueous phase is appropriately decided according to the type of the dispersion stabilizer and the auxiliary stabilizer to be used. For example, when silica such as colloidal silica is used as the dispersion stabilizer, polymerization is performed in an acidic medium. The aqueous medium is made acidic by adjusting the pH of the system to 3 to 4 by adding an acid such as hydrochloric acid as needed. When magnesium hydroxide or calcium phosphate is used, polymerization is performed in an alkaline medium.

In the method for producing the thermally expandable microcapsule, next, the step of dispersing an oily mixture in the aqueous medium is performed. The oily mixture contains 40 to 90% by weight of the polymerizable monomer (I), 5 to 50% by weight of the radically polymerizable unsaturated carboxylic acid monomer (II) having a carboxy group and having a carbon number of 3 to 8, and a volatile expansion agent. In this step, the monomers and the volatile expansion agent may be separately added to the aqueous dispersion medium to prepare the oily mixture in the aqueous dispersion medium. Typically, however, they are mixed in advance to form the oily mixture, and the obtained oily mixture is added to the aqueous dispersion medium. In this case, the oily mixture and the aqueous dispersion medium may be prepared in separate containers in advance, mixed in another container with stirring to disperse the oily mixture in the aqueous dispersion medium, and then added to the polymerization reaction container.

The polymerization initiator is used to polymerize the monomers. The polymerization initiator may be added to the oily mixture in advance, or may be added after the aqueous dispersion medium and the oily mixture are mixed with stirring in the polymerization reaction container.

The oily mixture may be emulsified to a predetermined particle size in the aqueous dispersion medium by, for example, a method including stirring with a homomixer (e.g., available from Tokushu Kika Kogyo Co., Ltd.), or a method including passing the oily mixture and the aqueous dispersion medium through a static dispersion apparatus such as a line mixer or an element static dispersion machine.

Here, the aqueous dispersion medium and the polymerizable mixture may be separately fed to the static dispersion apparatus, or a dispersion obtained by mixing and stirring in advance may be fed to the dispersion apparatus.

The thermally expandable microcapsule can be produced by performing the step of polymerizing the monomers by, for example, heating the dispersion obtained through the above steps. The thermally expandable microcapsule produced by such a method has a high maximum foaming temperature and excellent heat resistance, and neither breaks nor shrinks in a high temperature range or during molding processing. The thermally expandable microcapsule also has a high bulk specific gravity, so that foaming due to shear during production of the masterbatch is prevented, allowing stable production of a non-foamed masterbatch.

The masterbatch for foam molding of the present invention may contain a chemical foaming agent. For example, when the masterbatch contains a chemical foaming agent such as sodium hydrogen carbonate, $CO_2$ produced upon decomposition can improve the foamability. In addition, using a chemical foaming agent in combination with the thermally expandable microcapsule can reduce the formation of open cells, which tends to occur when the chemical foaming agent is used alone.

The chemical foaming agent may be any chemical foaming agent that is powdery at room temperature, and may be a conventional, common chemical foaming agent. Specific examples thereof include inorganic chemical foaming agents such as sodium hydrogen carbonate and organic chemical foaming agents such as azodicarbonamide, N,N'-dinitrosopentamethylenetetramine, P,P'-oxybisbenzenesulfonylhydrazide, and paratoluenesulfonylhydrazide.

The masterbatch for foam molding of the present invention may contain an additive such as a lubricant. The lubricant contained in the masterbatch reduces the shear applied to the thermally expandable microcapsule during production of the masterbatch, so that slight foaming is less likely to occur. The lubricant also improves the dispersibility of the thermally expandable microcapsule and makes it easier to produce a masterbatch. As a result, a masterbatch with a high concentration of the thermally expandable microcapsule can be stably produced with good production efficiency.

The lubricant may be any lubricant that dissolves at a temperature in production of the masterbatch, and may be a conventional, common lubricant. Specific examples thereof include polyethylene wax having a viscosity average molecular weight of 3,000 or less, glycerol fatty acid esters such as glycerol monostearate and diglycerol stearate, fatty acids such as stearic acid, and composite lubricants.

In the masterbatch for foam molding of the present invention, the difference between the foaming starting temperature of the thermally expandable microcapsule and the melting point of the olefin elastomer (foaming starting temperature of thermally expandable microcapsule—melting point of olefin elastomer) is preferably 50° C. or more. This makes it possible to reduce foaming during production of the masterbatch, allowing production of a foam molded article having a high expansion ratio. The difference is more preferably 60° C. to 170° C.

In the masterbatch for foam molding of the present invention, the difference between the maximum foaming temperature of the thermally expandable microcapsule and the melting point of the olefin elastomer (maximum foaming temperature of thermally expandable microcapsule—melting point of olefin elastomer) is preferably 80° C. or more. This makes it possible to reduce foaming during production of the masterbatch. The difference is more preferably 100° C. to 200° C.

The masterbatch for foam molding of the present invention may be in any form, such as a powder form, a granular form, a bulk form, a strand form, a pellet form, or a sheet form.

The lower limit of the true specific gravity of the masterbatch for foam molding of the present invention is 0.80 g/cm$^3$. A true specific gravity of less than 0.80 g/cm$^3$ indicates that the thermally expandable microcapsule in the masterbatch is swollen. Thus, with such a true specific gravity, the molded article obtained after molding has a reduced expansion ratio.

The lower limit of the true specific gravity is preferably 0.90 g/cm$^3$ and the upper limit thereof is preferably 1.0 g/cm$^3$.

The true specific gravity means a specific gravity of only the material excluding pores, and indicates the ratio of the mass of a unit volume of the masterbatch at 20° C. to the mass of an equal volume of water at 4° C. The true specific gravity can be measured by a method in conformity with Method A (water displacement method) of JIS K 7112.

The lower limit of the bulk specific gravity of the masterbatch for foam molding of the present invention is preferably 0.35 g/cm$^3$. Especially in injection molding, since the masterbatch is weighed at a constant volume, the masterbatch with a low bulk specific gravity has a low weight. As a result, the resulting molded article may have a reduced expansion ratio.

The lower limit of the bulk specific gravity is more preferably 0.38 g/cm$^3$ and the upper limit thereof is preferably 0.50 g/cm$^3$.

The bulk specific gravity means a specific gravity based on the volume of an aggregate of the masterbatch in closest packing in a container or the like.

The bulk specific gravity can be measured in conformity with JIS K 6721.

When the masterbatch for foam molding of the present invention is in a granular form or a pellet form, the lower limit of the masterbatch size is preferably 450 mg/30 pcs. When the masterbatch size is less than 450 mg/30 pcs, the masterbatch size is small, so that the masterbatch has an increased surface area. The base resin thus dissolves earlier due to the temperature or shear in the molding machine. This may decrease the effect of increasing the melting point of the base resin in a masterbatch to prevent the thermally expandable microcapsule from foaming earlier in a cylinder.

The lower limit of the masterbatch size is more preferably 470 mg/30 pcs and the upper limit thereof is preferably 600 mg/30 pcs.

The masterbatch size is an index of the size of the masterbatch and is expressed as the total weight of 30 pieces of the masterbatch.

The masterbatch size can be determined by randomly collecting 30 pieces of the masterbatch and measuring the weight.

The method for producing the masterbatch for foam molding of the present invention is not limited. In an exemplary method, raw materials such as a base resin containing an olefin elastomer and additives (e.g., a lubricant) are kneaded in advance with a co-rotating twin-screw extruder or the like. Subsequently, the kneaded product is heated to a predetermined temperature. A foaming agent containing the thermally expandable microcapsule is added thereto, followed by kneading. The resulting kneaded product is formed into a pellet form by cutting to a desired size with a pelletizer, whereby a masterbatch is obtained. In the case where slight foaming occurs at this time, a desired expansion ratio is less likely to be achieved in the subsequent foam molding, and great variation in the expansion ratio occurs.

Other methods that can be used include a method involving kneading raw materials such as the base resin, the thermally expandable microcapsule, and the lubricant with a batch-type kneader and granulating the mixture with a granulator, and a method involving producing a pellet form masterbatch with an extruder and a pelletizer.

The kneader may be any kneader that can knead without breaking the thermally expandable microcapsule. Examples thereof include a pressurizing kneader and a Banbury mixer.

A foam molded article can be produced by adding a matrix resin such as a thermoplastic resin to the masterbatch for foam molding of the present invention to prepare a resin composition, and molding the resin composition by a molding method such as injection molding to foam the resin composition with the thermally expandable microcapsule by heating in the molding. Such a foam molded article is also encompassed by the present invention.

The foam molded article of the present invention obtained by such a method has a high expansion ratio and high appearance quality, and contains uniformly formed closed cells. The foam molded article thus is very light and excellent in heat insulation properties, shock resistance, rigidity, and the like, and can be suitably used in applications such as building materials for housing, automobile members, and shoe soles.

The matrix resin (e.g., a thermoplastic resin) is not limited as long as it does not interfere with the purposes of the present invention. For example, the matrix resin may be a common thermoplastic resin such as polyvinyl chloride, polystyrene, polypropylene, polypropylene oxide, or polyethylene. Alternatively, the matrix resin may be an engineering plastic such as polybutylene terephthalate, nylon, polycarbonate, or polyethylene terephthalate. Alternatively, the matrix resin may be a thermoplastic elastomer such as an ethylene thermoplastic elastomer, a vinyl chloride thermoplastic elastomer, an olefin thermoplastic elastomer, a urethane thermoplastic elastomer, or an ester thermoplastic elastomer. These resins may be used in combination. The matrix resin is preferably the same resin as the base resin.

The amount of the masterbatch for foam molding of the present invention added is preferably 0.5 to 20 parts by weight, more preferably 1 to 10 parts by weight relative to 100 parts by weight of the thermoplastic resin.

The method for producing the foam molded article of the present invention is not limited. Examples thereof include knead molding, calender molding, extrusion molding, and injection molding. The injection molding may be performed by any method. Examples of the method include a short shot method, in which part of a resin material is placed in a mold and foamed, and a core back method, in which a mold is fully filled with a resin material and then opened enough to achieve a desired foam size.

Applications of the molded article obtained by the method for molding the foam molded article of the present invention include, for example, automotive interior materials such as door trims and instrument panels, and automotive exterior materials such as bumpers.

Applications also include building materials such as wood plastics, shoe soles, and artificial corks.

Advantageous Effects of Invention

The present invention can provide a masterbatch for foam molding which can be suitably used in molding involving high shear force or molding requiring low molding temperature and which can provide a foam molded article having a high expansion ratio and good appearance quality. Use of the masterbatch for foam molding of the present invention also provides good dispersibility of the thermally expandable microcapsule, allowing production of a foam molded article having uniform cells. The present invention also can provide a foam molded article formed from the masterbatch for foam molding.

DESCRIPTION OF EMBODIMENTS

Embodiments of the present invention are more specifically described in the following with reference to, but not limited to, examples.

(Production of Thermally Expandable Microcapsule)

A polymerization reaction container was charged with 300 parts by weight of water, 89 parts by weight of sodium chloride as an adjustor, 0.07 parts by weight of sodium nitrite as a water-soluble polymerization inhibitor, 8 parts by weight of colloidal silica (available from Asahi Denka) as a dispersion stabilizer, and 0.3 parts by weight of polyvinylpyrrolidone (available from BASF), whereby an aqueous dispersion medium was prepared. Subsequently, the aqueous dispersion medium was mixed with an oily mixture containing a metal salt, monomers, a volatile expansion agent, and a polymerization initiator in the amounts shown in Table 1, whereby a dispersion was prepared. The total dispersion was 15 kg. The obtained dispersion was stirred and mixed with a homogenizer, fed to a pressure polymerization vessel (20 L) purged with nitrogen, pressurized (0.2 MPa), and reacted at 60° C. for 20 hours to give a reaction product. The obtained reaction product was repeatedly dehydrated and water-washed with a centrifuge, and dried to give thermally expandable microcapsules (Nos. 1 to 3).

In Table 1, the polymerizable monomer (I) is denoted as Monomer (I), the radically polymerizable unsaturated carboxylic acid monomer (II) as Monomer (II), and the polymerizable monomer (III) as Monomer (III).

Examples 1 to 8 and Comparative Examples 1 to 5

(Production of Masterbatch Pellets)

An amount of 100 parts by weight of the base resin shown in Table 2 was kneaded with 10 parts by weight of a fatty acid ester as a lubricant with a Banbury mixer. When about 100° C. was reached, the obtained thermally expandable microcapsules were added in the amount shown in Table 2, followed by kneading for additional 30 seconds. The kneaded product was extruded and pelletized at the same time, whereby masterbatch pellets were obtained. In Table 2, EMMA denotes ethylene-methyl methacrylate copolymer. LDPE denotes low density polyethylene.

The following olefin elastomers (TPOs, propylene elastomers) were used.

Propylene elastomer [TPO (1)]: melt index: 3.7 g/10 min, melting point: 75° C., propylene content: 91% by weight, ethylene content: 9% by weight The displacement was measured in the perpendicular direction of a measuring terminal. The temperature at which the displacement began to increase was defined as the foaming starting temperature. The maximum value of the displacement was defined as the maximum displacement. The temperature at which the maximum displacement was obtained was defined as the maximum foaming temperature.

TABLE 1

|  |  |  |  | ① | ② | ③ |
|---|---|---|---|---|---|---|
| Thermally expandable microcapsule | Amount (parts by weight) | Monomer (I) | Acrylonitrile | 20 | 20 | 70 |
|  |  |  | Methacrylonitrile | 30 | 30 | 30 |
|  |  | Monomer (II) | Methacrylic acid | 30 | 30 | 0 |
|  |  | Monomer (III) | Trimethylolpropane trimethacrylate | 0 | 0 | 0.4 |
|  |  | Metal salt (IV) | Zinc hydroxide | 1.5 | 1.5 | 0 |
|  |  | Other monomers | Methyl methacrylate | 20 | 20 | 0 |
|  |  | Volatile expansion agent | Isopentane | 15 | 0 | 25 |
|  |  |  | Isooctane | 10 | 25 | 0 |
|  |  | Polymerization initiator | 2,2'-Azobisisobutyronitrile | 0.8 | 0.8 | 0.8 |
|  |  |  | 2,2'-Azobis(4-methoxy-2,4-dimethylvaleronitrile) | 0.6 | 0.6 | 0.6 |
|  | Volume average particle size (μm) |  |  | 24 | 28 | 26 |
|  | Foaming starting temperature (Ts) (° C.) |  |  | 174 | 210 | 120 |
|  | Maximum foaming temperature (Tmax) (° C.) |  |  | 218 | 230 | 165 |
|  | Maximum displacement (Dmax) (μm) |  |  | 800 | 800 | 1000 |

Propylene elastomer [TPO (2)]: melt index: 3.6 g/10 min, melting point: 65° C., propylene content: 89% by weight, ethylene content: 11% by weight Propylene elastomer [TPO (3)]: melt index: 20 g/10 min, melting point: 65° C., propylene content: 87% by weight, ethylene content: 13% by weight Ethylene elastomer [TPO (4)]: melt index: 5 g/10 min, melting point: 59° C., ethylene content: 24% by weight, 1-octene content: 76% by weight (Production of Foam Molded Article)

An amount of 3 parts by weight of the obtained masterbatch pellets were mixed with 100 parts by weight of an olefin elastomer (available from Mitsui Chemicals, Inc., MILASTOMER 7030BS). The mixed pellets were fed to a hopper of an extruder, melted and kneaded, and extrusion molded into a sheet form molded article. The extrusion was performed at a mold temperature of 190° C.

(Evaluation)

The thermally expandable microcapsules (Nos. 1 to 3) and the molded articles obtained in Examples 1 to 8 and Comparative Examples 1 to 5 were evaluated for the following properties. Table 1 and Table 2 show the results.

(1) Evaluation of Thermally Expandable Microcapsules (1-1) Volume Average Particle Size The volume average particle size was measured with a particle size distribution analyzer (LA-910, available from HORIBA, Ltd.).

(1-2) Foaming Starting Temperature, Maximum Foaming Temperature, and Maximum Displacement The foaming starting temperature (Ts), maximum displacement (Dmax), and maximum foaming temperature (Tmax) were measured with a thermomechanical analyzer (TMA) (TMA2940, available from TA Instruments). Specifically, 25 μg of a sample was placed in an aluminum container having a diameter of 7 mm and a depth of 1 mm, and heated at a temperature increase rate of 5° C./min from 80° C. to 220° C. with a force of 0.1 N applied from the top.

(2) Evaluation of Masterbatch Pellet (2-1) Measurement of True Specific Gravity

The true specific gravity of the masterbatch pellets was measured by a method in conformity with Method A (water displacement method) of JIS K 7112 with a densimeter MD-200S (available from Alfa Mirage, Co., Ltd.).

(2-2) Measurement of Bulk Specific Gravity

The bulk specific density was measured by a method in conformity with JIS K 6721.

(2-3) Measurement of Masterbatch Size

Thirty pellets were randomly collected from the obtained masterbatch pellets. The total weight of the 30 pellets was measured.

(3) Evaluation of Molded Article (3-1) Density and Expansion Ratio

The density before foaming and the density of the obtained molded article (after foaming) were measured by a method in conformity with Method A (water displacement method) of JIS K 7112.

The expansion ratio was calculated from the density of the molded article before and after foaming.

(3-2) Surface Properties

The surface roughness (Rz) of the molded article surface was measured with a 3D shape form measurement system (available from Keyence Corporation). The surface properties were evaluated according to the following criteria.

○ (Good): The measured Rz value was less than 50 μm.

Δ (Fair): 50 μm≤Rz value≤100 μm

× (Poor): The measured Rz value was more than 100 μm.

(3-3) Dispersibility

A cross section of the obtained molded article was visually observed with an electron microscope. The dispersibility of the thermally expandable microcapsules was evaluated according to the following criteria.

○ (Good): Cell distribution was uniform.

× (Poor): Cell distribution was not uniform.

TABLE 2

|  |  | Example | | | | | | |
|---|---|---|---|---|---|---|---|---|
| Thermally expandable microcapsule No. | | (1) ① | (2) ① | (3) ① | (4) ① | (5) ② | (6) ② | (7) ① |
| Base resin used in masterbatch | Type | TPO (1) | TPO (2) | TPO (3) | TPO (4) | TPO (1) | TPO (2) | TPO (1) |
| | Melt index (g/10 min) | 3.7 | 3.6 | 20 | 5 | 3.7 | 3.6 | 3.7 |
| | Melting point (° C.) | 75 | 65 | 65 | 59 | 75 | 65 | 75 |
| Ts - melting point of base resin (° C.) | | 99 | 109 | 109 | 115 | 135 | 145 | 99 |
| Tmax - melting point of base resin (° C.) | | 143 | 153 | 153 | 159 | 155 | 165 | 143 |
| Amount of thermally expandable microcapsules in masterbatch relative to 100 parts by weight of base resin (parts by weight) | | 100 | 100 | 100 | 100 | 100 | 100 | 50 |
| Amount of masterbatch in molded article relative to 100 parts by weight of olefin elastomer (parts by weight) | | 3 | 3 | 3 | 3 | 3 | 3 | 3 |
| Masterbatch evaluation | True specific gravity (g/cm³) | 0.92 | 0.93 | 0.92 | 0.93 | 0.93 | 0.91 | 0.91 |
| | Bulk specific gravity (g/cm³) | 0.44 | 0.42 | 0.43 | 0.42 | 0.42 | 0.41 | 0.41 |
| | Masterbatch size (mg/30 pcs) | 490 | 480 | 470 | 480 | 470 | 480 | 470 |
| Molded article evaluation | Density (g/cm³) | 0.68 | 0.68 | 0.7 | 0.69 | 0.72 | 0.73 | 0.73 |
| | Expansion ratio | 1.29 | 1.29 | 1.26 | 1.28 | 1.22 | 1.21 | 1.21 |
| | Surface properties | ○ | ○ | ○ | ○ | ○ | ○ | ○ |
| | Dispersibility | ○ | ○ | ○ | ○ | ○ | ○ | ○ |

|  |  | Example | Comparative Example | | | | |
|---|---|---|---|---|---|---|---|
| Thermally expandable microcapsule No. | | (8) ① | (1) ① | (2) ① | (3) ① | (4) ① | (5) |
| Base resin used in masterbatch | Type | TPO (1) | TPO (1) | TPO (1) | LDPE | EMMA | TPO (1) |
| | Melt index (g/10 min) | 3.7 | 3.7 | 3.7 | 55 | 450 | 3.7 |
| | Melting point (° C.) | 75 | 75 | 75 | 105 | 67 | 75 |
| Ts - melting point of base resin (° C.) | | 99 | 99 | 99 | 69 | 107 | 45 |
| Tmax - melting point of base resin (° C.) | | 143 | 143 | 143 | 113 | 151 | 90 |
| Amount of thermally expandable microcapsules in masterbatch relative to 100 parts by weight of base resin (parts by weight) | | 200 | 30 | 500 | 100 | 100 | 100 |
| Amount of masterbatch in molded article relative to 100 parts by weight of olefin elastomer (parts by weight) | | 3 | 3 | 3 | 3 | 3 | 3 |
| Masterbatch evaluation | True specific gravity (g/cm³) | 0.93 | 0.90 | Masterbatch producion failed | 0.95 | 0.93 | 0.73 |
| | Bulk specific gravity (g/cm³) | 0.44 | 0.41 | | 0.4 | 0.39 | 0.33 |
| | Masterbatch size (mg/30 pcs) | 490 | 460 | | 470 | 470 | 350 |
| Molded article evaluation | Density (g/cm³) | 0.63 | 0.81 | | 0.67 | 0.69 | 0.79 |
| | Expansion ratio | 1.40 | 1.09 | | 1.31 | 1.28 | 1.11 |
| | Surface properties | ○ | ○ | | Δ | Δ | x |
| | Dispersibility | ○ | ○ | | x | x | x |

INDUSTRIAL APPLICABILITY

The present invention can provide a masterbatch for foam molding which can be suitably used in molding involving high shear force or molding requiring low molding temperature and which can provide a foam molded article having a high expansion ratio and good appearance quality. The present invention also aims to provide a foam molded article formed from the masterbatch for foam molding.

The invention claimed is:

1. A masterbatch for foam molding, comprising:
a base resin; and
a thermally expandable microcapsule,
the masterbatch having a true specific gravity of 0.90 g/cm³ or more,
the base resin containing an olefin elastomer having a melt index of 2 to 20 g/10 min at 190° C. pressurized at 2.16 kg,
the thermally expandable microcapsule having a bulk specific gravity of 0.40 g/cm³ or more,
the masterbatch containing the thermally expandable microcapsule in an amount of 40 to 300 parts by weight relative to 100 parts by weight of the base resin,
a difference between a foaming starting temperature of the thermally expandable microcapsule and a melting point of the olefin elastomer being 50° C. or more,
the olefin elastomer comprising a propylene elastomer containing an ethylene component and propylene component, and having a melting point of 50° C. to 120° C., and
the propylene elastomer having a content of the ethylene component of 3 to 13% by weight.

2. The masterbatch for foam molding according to claim 1,
wherein the thermally expandable microcapsule includes: a shell containing a polymer; and a volatile expansion agent as a core agent encapsulated by the shell, and
the shell contains a polymer obtained by polymerizing a monomer mixture that contains a polymerizable monomer (I) containing at least one selected from the group consisting of acrylonitrile, methacrylonitrile, and vinylidene chloride.

3. The masterbatch for foam molding according to claim 2,
wherein the monomer mixture contains
40 to 90% by weight of the polymerizable monomer (I) containing at least one selected from the group consisting of acrylonitrile, methacrylonitrile, and vinylidene chloride, and 5 to 50% by weight of a radically polymerizable unsaturated carboxylic acid monomer (II) having a carboxy group and having a carbon number of 3 to 8.

4. The masterbatch for foam molding according to claim 2, wherein the monomer mixture contains 40 to 90% by weight of the polymerizable monomer (I) containing at least one selected from the group consisting of acrylonitrile, methacrylonitrile, and vinylidene chloride, and 5 to 50% by weight of a radically polymerizable unsaturated carboxylic acid monomer (II) having a carboxy group and having a carbon number of 3 to 8, and the monomer mixture is free of a polymerizable monomer (III) having two or more double bonds in a molecule.

5. The masterbatch for foam molding according to claim 2, wherein the monomer mixture contains 40 to 90% by weight of the polymerizable monomer (I) containing at least one selected from the group consisting of acrylonitrile, methacrylonitrile, and vinylidene chloride, 5 to 50% by weight of a radically polymerizable unsaturated carboxylic acid monomer (II) having a carboxy group and having a carbon number of 3 to 8, and 0.2% by weight or less of a polymerizable monomer (III) having two or more double bonds in a molecule and/or 0.1 to 10% by weight of a metal cation hydroxide (IV).

6. The masterbatch for foam molding according to claim 2, wherein the monomer mixture contains 40 to 90% by weight of the polymerizable monomer (I) containing at least one selected from the group consisting of acrylonitrile, methacrylonitrile, and vinylidene chloride, 5 to 50% by weight of a radically polymerizable unsaturated carboxylic acid monomer (II) having a carboxy group and having a carbon number of 3 to 8, and 0.1 to 10% by weight of a metal cation hydroxide (IV), and the monomer mixture is free of a polymerizable monomer (III) having two or more double bonds in a molecule.

7. The masterbatch for foam molding according to claim 1, wherein the thermally expandable microcapsule has a maximum foaming temperature of 180° C. or higher.

8. A foam molded article formed from the masterbatch for foam molding according to claim 1.

9. The masterbatch for foam molding according to claim 1, wherein a difference between a maximum foaming temperature of the thermally expandable microcapsule and a melting point of the olefin elastomer is 100° C. or more.

* * * * *